March 5, 1957 W. E. GREENAWALT 2,784,076
ORE TREATING PROCESSES
Filed Oct. 20, 1953
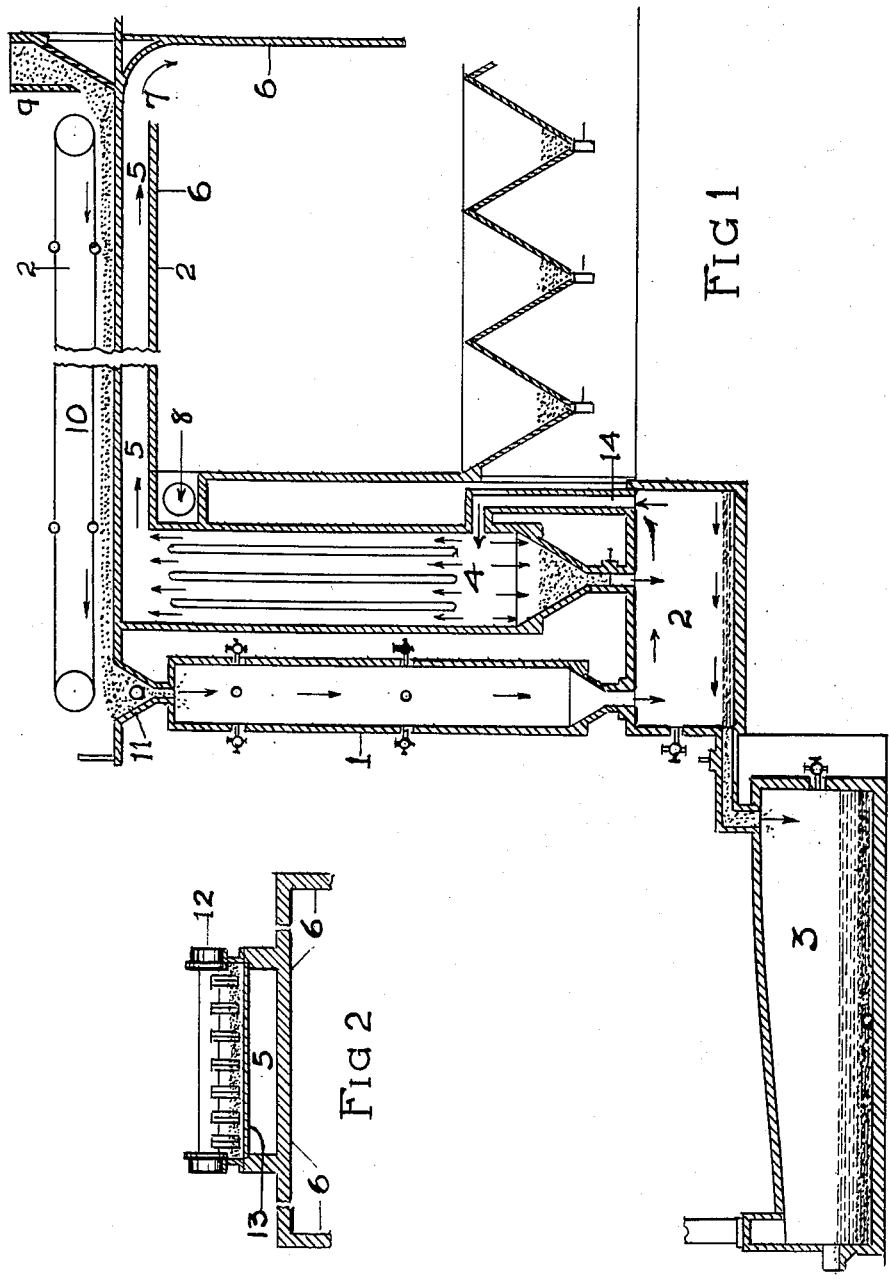
INVENTOR.
William E. Greenawalt United States Patent Office 2,784,076
Patented Mar. 5, 1957

2,784,076

ORE TREATING PROCESSES

William E. Greenawalt, Denver, Colo.

Application October 20, 1953, Serial No. 387,176

6 Claims. (Cl. 75—20)

My invention relates to the treatment of finely divided metallic ore. It will be described more particularly to the smelting of finely divided copper sulphide ore, such as flotation concentrates.

In the heat treatment of finely divided ore, such as flotation concentrate, one of the outstanding problems has been that of cheaply and effectively drying the ore preparatory to showering it through the furnace for the purpose of roasting or melting it while in suspension in the furnace.

The ore showered through a shaft heating furnace should be free from moisture and at the highest practical temperature consistent with the maximum capacity and minimum consumption of fuel in the general treatment of the ore.

The usual procedure for drying ore, is to rabble it in the presence of waste roaster or smelter gas, or to rabble it over the roof of a dust chamber heated with the hot gas in it. If the ore is dried in the presence of hot waste roaster or smelter gas is creates an abnormal amount of dust. If dried over a dust chamber roof heated with the gas within it, the drying is imperfect and inefficient, due largely to the constant low temperature of the large volume of cooled gas in the dust chamber.

The process will now be described by referring to the accompanying drawings, in which Fig. 1 is a diagrammatic cross section representing the general process, and Fig. 2 a detail section on the line 2—2 of Fig. 1.

1 is a heating furnace to melt the finely divided copper ore, such as flotation concentrate, showered through it. The resulting molten ore product, consisting principally of a mixture of copper matte and slag, and the hot heating furnace gas, is flowed into a gas separating chamber 2 where the mixture of molten matte and slag is separated from the hot waste gas.

The molten mixture of copper matte and slag, separated from the heating furnace gas, is then flowed into a reverberatory smelting furnace 3 to separate the valuable matte from the worthless slag in the usual way.

The dust laden gas from the separating chamber 2, at a temperature of about 2000 to 2300 deg. F., is passed through the flue 14 into a heat exchanger 4, to lower its temperature, to heat fresh air, and to settle some of the dust, after which it is used to dry fresh ore by passing it through the conduit 5 into the dust chamber 6, with its outlet 7 at the farther end of the dust chamber, where it mingles with the large volume of the dust chamber atmosphere, and is exhausted from the dust chamber, by a reverse flow, through the dust chamber outlet 8. The dust chamber may be any means of collecting the dust after it has passed through the conduit 5, such as a bag house.

The wet ore from the drier bin 9 is fed to the drier 10, and rabbled and advanced over the upper surface of the conduit 5, while drying, against an increasing temperature, toward the hopper 11 over the heating furnace 1. The upper surface of the conduit is also the bottom of the drier. The detail of this is shown in Fig. 2, in which 5 is the conduit, 6 is the dust chamber, 12 the rabbling mechanism, and 13 the upper surface of the gas conduit and bottom of the drier over which the ore is rabbled. This common surface may be conveniently made of thin cast iron, which is a good conducter of heat, and is not appreciably affected by the lowered temperature of the gas passing through the conduit.

The dust laden gas as it comes from the heating furnace 1, at a temperature of about 2000 to 2300 deg. F., is too hot to be safely applied directly to the drier; it might agglomerate the ore, and there is danger of dust settling in the conduit 5 to choke the flow of gas through it. To eliminate these dangers, and to provide fresh hot air for the reactions in the heating furnace and elsewhere in the process, the gas issuing from the heating furnace, at a temperature of about 2000 to 2300 deg. F., is preferably first passed through the heat exchanger 4 to reduce its temperature to about 800 to 1000 deg. F. for its best use in the drier, to eliminate most of the dust, and to provide fresh hot air for the heating furnace and other uses.

The ore as it leaves the drier should be as hot as practical—about 350 deg. F.—at which point sulphur of sulphide ores begins to volatilize. The finely divided ore, at about that temperature, showered into the highly heated atmosphere of 2700 to 3000 deg. F., in the presence of fresh air preheated to 800 to 1000 deg. F., would flash instantly to the reacting temperature and convert the ore into a molten condition.

The elimination of sulphur, in flotation copper concentrate, can be made almost complete in its drop through the highly heated atmosphere of the heating furnace in the presence of an abundance of hot fresh air. The air can be controlled to get any grade of matte desired. If desired, the copper might be recovered as the practically pure sulphide, or even as the impure metal.

The molten ore, separated from the heating furnace gas in the separating chamber 2, is preferably flowed into the smelting furnace 3 through its roof and dropped downwardly across the path of the highly heated atmosphere of the fuel burners at the charge end of the smelting furnace. This helps to quickly and economically raise the temperature of the smelting furnace charge for the effective separation of matte and slag. The temperature at the focal point of the heat of the burners can be closely controlled, largely because there is no harmful and useless gas in the smelting furnace which has to be heated to the highest temperature of the smelting furnace for effective smelting, but also because the temperature of combustion of the gases from the burners can be controlled to get the highest practical temperature at the focal vicinity. For example; if petroleum is used as the burner fuel, the temperature of combustion, with the theoretical supply of air (15.45 lbs., or 200 cu. ft., per lb. of fuel) will be 5050 deg. F.; with twice the theoretical supply of air it will be 2710 deg. F.; with three times the theoretical supply of air it will be only 1850 deg. F. The object therefore would be to maintain the highest practical temperature at the focal heat vicinity through which the molten ore flows into the smelting furnace by regulating the amount of air in the burners. The burner blast will slightly scatter the molten ore flowing through it. If excess air is needed in the smelting furnace it could be introduced in some other way.

The dust which settles out in the heat exchanger 4 is transferred into the gas separating chamber 2 where it is fused and combines with the molten ore produced in the heating furnace 1 before it is transferred to the smelting furnace 3. The relatively small amount of fine flue dust which settles out in the dust chamber 6 may also be charged into the separating chamber 2 to be fused with the molten ore from the heating furnace 1, and transferred in a molten state into the smelting furnace 3. The heat exchanger should be made large enough to settle all but the fume and finest dust to prevent possible clogging in the drier conduit 5. If the heat exchanger 4 is placed directly over the separating chamber 2 the settled dust can be dropped at intervals directly into the separating chamber 2, and thus avoid unpleasant and unnecessary handling of the dust. The separating chamber itself acts as an inefficient dust settler, because it can be made as large as desired to reduce the draft, and the dust has to reverse its flow to enter the heat exchanger. Then, too, the fused fine particles settle easier than the same unfused particles. The gas entering the heat exchanger will probably contain less dust than the gas issuing from a reverberatory furnace in ordinary practice. The amount of unsettled dust passing through the heat exchanger can be largely controlled by the size of the heat exchanger. In addition, the volume of gas passing into the heat exchanger will be much smaller as compared with that exhausted from a reverberatory smelting furnace, smelting finely divided cold wet ore, as in present practice.

Since the ore and the dust are charged molten from the separating chamber 2 into the smelting furnace 3, the dust nuisance is enormously reduced, because the ore is charged molten, and the gas passing through the furnace is very much less.

Fusing the dust in the separating chamber 2 presents marked operational advantages. Reverberatory furnaces are expensive to install and hard to keep in repair, especially the reverberatory arch, which cannot be water jacketed or fettled. The highest temperature in such a furnace is at the arch, and dust at high temperature is very corrosive and shortens the life of the furnace. In my process the action of hot ore and gas is also present in the heating furnace, but it is greatly diminished, due to the fact that the temperature of the heating furnace walls can be cooled with water jackets or otherwise, and the walls are easily replaced as compared with the construction of a reverberatory arch.

It has been noted that the capacity of the smelting furnace is greatly increased by my process—from two to three times that when operating under the ordinary conditions of smelting wet flotation copper concentrate. The drying, melting, and gas separating units may be more limited. It would be desirable therefore, in big scale operations, to combine the molten ore of, say, three melting furnace units, consisting of drier, heating furnace, and gas separator, each having a capacity of 1000 tons a day, with a common smelting furnace having a capacity of 3000 tons a day, and a common dust chamber so arranged that all of the drier conduits will deliver the heating furnace gas passing through them into it.

The air preheated in the heat exchanger may be used anywhere in the process, but principally through the burners in the heating and smelting furnaces.

It is preferred to exhaust the mixture of molten ore and hot gas from the heating furnace 1 through a restricted outlet at its bottom into the separating chamber 2, to promote coalescence, and to direct the flow of the mixture of molten ore and hot gas so as to bring it in contact with the surface of the pool of molten ore in the separating chamber 2 before the gas escapes into the heat exchanger 4; through the flue 14, and thus reduce the amount of dust going into the heat exchanger. The pool of molten ore in the heat exchanger may be large or small, deep or shallow, dependent on the results desired.

I claim:

1. A process of treating finely divided sulphide copper ore comprising, showering the ore through the highly heated atmosphere of a heating furnace to melt it, separating the molten ore from the hot heating furnace gas, transferring the molten ore separated from the heating furnace gas into a smelting furnace to separate the resulting copper matte from the resulting slag, passing the hot gas from the heating furnace through a conduit intermediate a dust chamber and an ore drier, delivering the ore to be dried to the upper surface of the conduit, heating the ore delivered to the drier with the heat of the heating furnace gas passing through the conduit into the dust chamber, rabbling the ore and advancing it toward the higher temperature of the gas inlet of the conduit, and delivering the dried ore to the heating furnace to melt it.

2. A process of treating finely divided metallic ore comprising, showering the ore through the highly heated atmosphere of a heating furnace to melt it, separating the molten ore from the hot heating furnace gas, removing a portion of the dust and lowering the temperature of the removed hot heating furnace gas, then passing the resulting hot heating furnace gas reduced in dust and temperature through a conduit into a dust chamber, delivering the ore to be dried to the upper surface of the conduit, heating the ore with the heat of the heating furnace gas passing through the conduit and delivering the gas into the dust chamber, rabbling and advancing the ore toward the higher temperature of the gas inlet of the conduit, delivering the dried ore to the heating furnace to melt it, and transferring the molten ore separated from the heating furnace gas to a smelting furnace to separate the molten metal product from the molten ore slag.

3. A process of treating finely divided metallic ore comprising, showering the ore through the highly heated atmosphere of a heating furnace to melt it, flowing the resulting mixture of molten ore and heating furnace gas into an enclosed separating chamber to separate them, withdrawing the heating furnace gas from the separating chamber, removing and recovering the dust from the withdrawn heating furnace gas, adding the removed and recovered dust to the molten ore in the separating chamber to fuse it, then flowing the mixture of molten ore and fused dust separated from the heating furnace gas into a smelting furnace to separate the molten metal product from the molten slag, and separately withdrawing the molten metal product and the molten ore slag from the smelting furnace.

4. A process of treating finely divided ore comprising, showering the ore through the highly heated atmosphere of a heating furnace to melt it, flowing the resulting mixture of molten ore and heating furnace gas into an enclosed separating chamber to separate them, withdrawing the heating furnace gas from the separating chamber, removing and recovering the dust from the withdrawn heating furnace gas, drying the ore with the heat in the resulting heating furnace gas, delivering the removed and recovered dust from the heating furnace gas into the separating chamber to fuse it, then smelting the mixture of molten ore and fused dust separated from the heating furnace gas to separate the molten metal product from the molten ore slag.

5. A process of treating finely divided ore comprising, showering the ore through the highly heated atmosphere of a heating furnace to melt it, flowing the resulting mixture of molten ore and heating furnace gas into an enclosed separating chamber to separate them, withdrawing the heating furnace gas from the separating chamber and passing it into a heat exchanger to remove and recover some of the dust, to reduce the temperature of the heating furnace gas, and to heat fresh air, drying the ore with the remaining heat in the heating furnace gas, flowing the preheated fresh air into the heating furnace, adding the removed and recovered dust from the heat exchanger to the molten ore in the separating chamber to fuse it, then flowing the molten ore and fused dust separated from the heating furnace gas into a smelting furnace to separate the molten metal product from the molten ore slag.

6. A process of treating finely divided ore comprising, showering the ore through the highly heated atmosphere of a heating furnace to subject it to high temperature reactions, separating the resulting reacted ore from the hot heating furnace gas, removing a portion of the dust from the separated heating furnace gas, passing the resulting heating furnace gas reduced in dust through a conduit into a dust chamber, delivering the ore to be dried to the upper surface of the conduit at its discharge end, drying the ore with the heat in the gas passing through the conduit and advancing the ore while drying toward the higher temperature of the gas inlet of the conduit, and delivering the dried ore to the heating furnace to be showered through it.

References Cited in the file of this patent

UNITED STATES PATENTS

| | | |
|---|---|---|
| 977,996 | Baggaley | Dec. 6, 1910 |
| 2,307,459 | Greenawalt | Jan. 5, 1943 |
| 2,506,557 | Byrk et al. | May 2, 1950 |